United States Patent
Cote

(10) Patent No.: US 9,282,727 B2
(45) Date of Patent: Mar. 15, 2016

(54) SEED PORT FOR BIRD FEEDER

(75) Inventor: Paul L. Cote, Lac Brome (CA)

(73) Assignee: Brome Bird Care Inc., Lac Brome, Quebec (CA)

( * ) Notice: Subject to any disclaimer, the term of this patent is extended or adjusted under 35 U.S.C. 154(b) by 585 days.

(21) Appl. No.: 13/385,259

(22) Filed: Feb. 10, 2012

(65) Prior Publication Data

US 2013/0206073 A1  Aug. 15, 2013

(51) Int. Cl.
*A01K 39/012* (2006.01)

(52) U.S. Cl.
CPC ......... *A01K 39/012* (2013.01); *Y10T 29/49826* (2015.01)

(58) Field of Classification Search
CPC ... A01K 31/12; A01K 39/01; A01K 39/0113; A01K 39/012
USPC ......... 119/51.01, 52.1, 52.2, 52.3, 57.8, 57.9, 119/429
IPC ............................... A01K 31/12, 39/01, 39/012
See application file for complete search history.

(56) References Cited

U.S. PATENT DOCUMENTS

| | | | | |
|---|---|---|---|---|
| 6,073,581 A * | 6/2000 | Wang | ......................... | 119/51.01 |
| 6,863,024 B1 * | 3/2005 | Obenshain | .................... | 119/57.8 |
| 7,610,876 B1 * | 11/2009 | Schulz | ......................... | 119/57.8 |
| 8,485,130 B2 * | 7/2013 | Cote | ............................. | 119/57.8 |
| 2004/0216684 A1 * | 11/2004 | Obenshain | .................... | 119/57.9 |
| 2006/0266295 A1 * | 11/2006 | McDarren | .................... | 119/57.8 |
| 2012/0006272 A1 * | 1/2012 | Colvin et al. | .............. | 119/51.01 |

\* cited by examiner

*Primary Examiner* — Lisa Tsang
(74) *Attorney, Agent, or Firm* — Eric Fincham

(57) ABSTRACT

A seed port for a bird feeder, the seed port being insertable into an aperture formed in the wall of the bird feeder, the seed port having at least one protrusion formed on a rear face of a front wall, the protrusion extending into a notch formed in a wall defining the aperture in the side wall. The seed port is not removeable after insertion.

5 Claims, 7 Drawing Sheets

SEED PORT FOR BIRD FEEDER

FIELD OF THE INVENTION

The present invention relates to bird seed containers and more particularly, relates to a seed port for a bird feeding device.

BACKGROUND OF THE INVENTION

Bird feeders are well known in the art and many different designs are available. The basic principle of one type of bird feeder is the provision of a seed container wherein the birds may gain access to the seed through a seed port opening in the side of the seed container. In order to prevent bird seed from falling out of the seed container, a seed port having a baffle is provided. A seed port will protect the seed from falling out of the container while, at the same time, providing access for the birds to the seeds.

Many different ways of forming and assembling seed ports are known in the art. These range from seed ports which are formed integrally with the seed container to those which are assembled as a separate component. The present invention provides a seed port which may be utilized with either a flat wall or an arcuate wall of a container and which seed port is permanently attached to the container.

SUMMARY OF THE INVENTION

It is an object of the present invention to provide a seed port which can be assembled, without fasteners, through the seed port aperture in a seed container having either a substantially flat or arcuate wall.

According to one aspect of the present invention, there is provided a bird feeder comprising a seed container having a side wall, the side wall having an aperture formed therein, the aperture being defined by an aperture wall having a plurality of segments, the aperture wall having first and second wall segments which are diametrically opposed to each other, a first recess intermediate the first and second wall segments, the first recess extending outwardly from the first and second wall segments and being defined by third and fourth arcuate wall segments, a notch being located between the third and fourth arcuate wall segments, a seed port inserted into the aperture, the seed port having a front wall and a baffle portion, first and second ribs extending outwardly from the baffle portion to define first and second channels respectively between the ribs and a rear face of the front wall, the first and second channels respectfully retaining the first and second wall segments therein, and a first protrusion formed on the rear face of the front wall, the first protrusion extending into the notch.

According to a further aspect of the present invention, there is also provided a method for assembling a bird feeder comprising the steps of supplying a seed container having a side wall, the side wall having an aperture formed therein, the aperture being defined by an aperture wall having a plurality of segments, the aperture wall having first and second wall segments which are diametrically opposed to each other, a first recess intermediate the first and second generally circular segments, the first recess extending outwardly from the first generally circular wall segment and being defined by first and second arcuate wall segments, a notch being located between the first and second arcuate wall segments, a point of joinder between the second arcuate wall segment and second generally circular wall segment having a wall forming a stop, a second recess formed between the first and second generally circular wall segments, the second recess being generally diametrically opposed to the first recess, a baffle inserted into the aperture, the baffle having a front wall and a main body portion, first and second ribs extending outwardly from the main body portion to define first and second channels respectively between the ribs and a rear face of the front wall, the first and second channels respectfully retaining the first and second generally circular wall segments therein, a first protrusion formed on the rear face of the front wall and a second protrusion formed on the rear face of the front wall, inserting the baffle body through the aperture formed in the side wall at an angle of 90° with respect to a correct positioning on the baffle, and rotating the baffle through 90° such that first and second generally circular wall segments will enter respective channels, and the first protrusion will enter the notch to prevent counter rotation, and the second protrusion will engage the stop to prevent further rotation.

Preferably, there is provided a second protrusion which is formed on the rear face of the front wall, the second protrusion being designed to abut a stop member to prevent over rotation of the seed port when installing the same. To this end, a point of joinder between the third wall segment and second wall segment form a stop for the second protrusion.

The first and second wall segments are normally of a generally semi-circular configuration although other configurations could also be utilized.

A third protrusion may also be formed on the rear face of the front wall, the third protrusion being designed to abut a stop formed in a second recess. The second recess is preferably substantially diametrically opposed to the first recess and has a stop wall formed therein against which the third protrusion will abut.

Conveniently, the side wall of the bird feeder and the seed port are formed of a plastic material although other materials such as a metal may be utilized.

BRIEF DESCRIPTION OF THE DRAWINGS

Having thus generally described the invention, reference will be made to the accompanying drawings illustrating an embodiment thereof, in which.

DETAILED DESCRIPTION OF THE INVENTION

Figure 1:
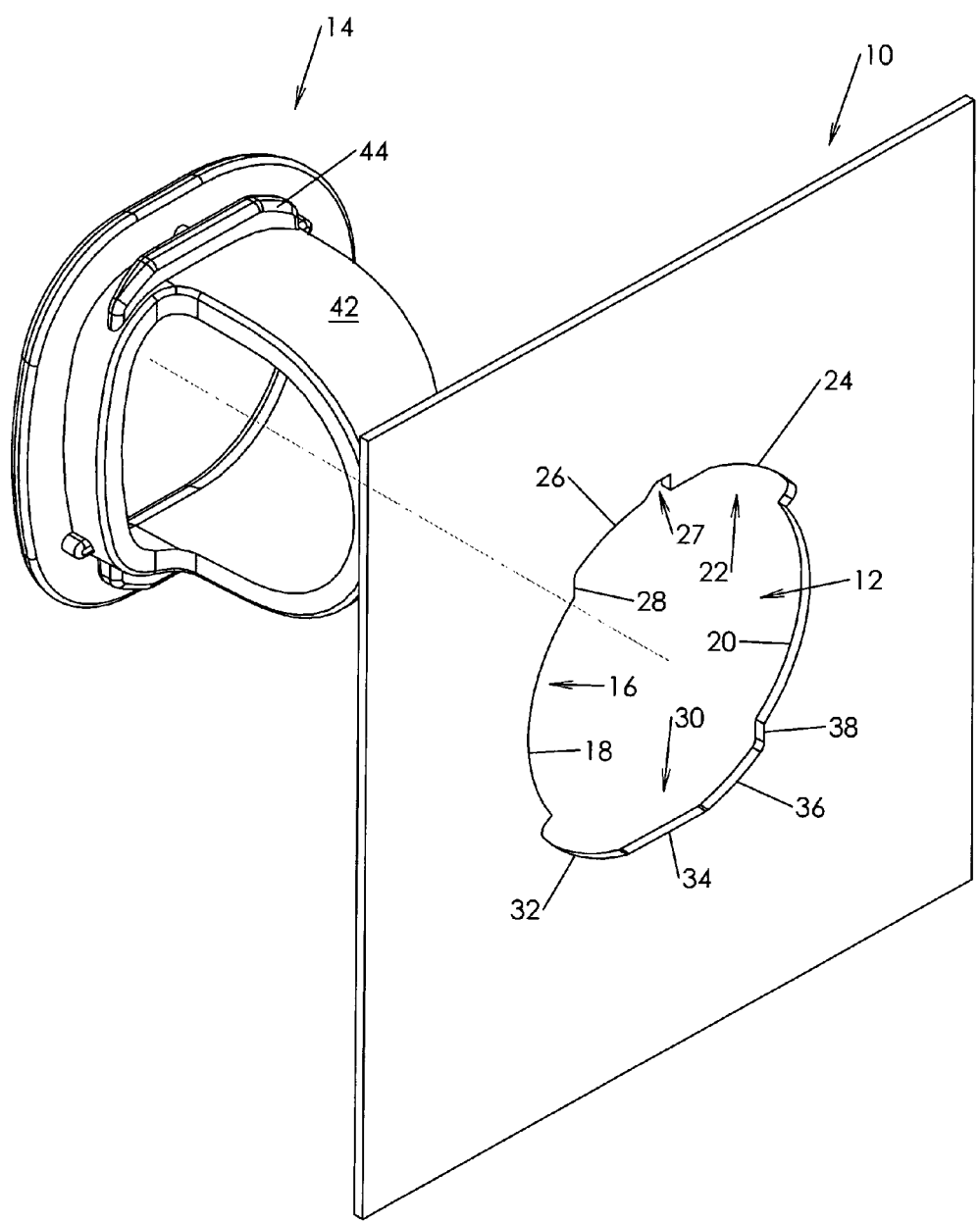
FIG. 1 is a perspective view of a portion of a wall of a seed container and a seed port therefore.
Figure 2:
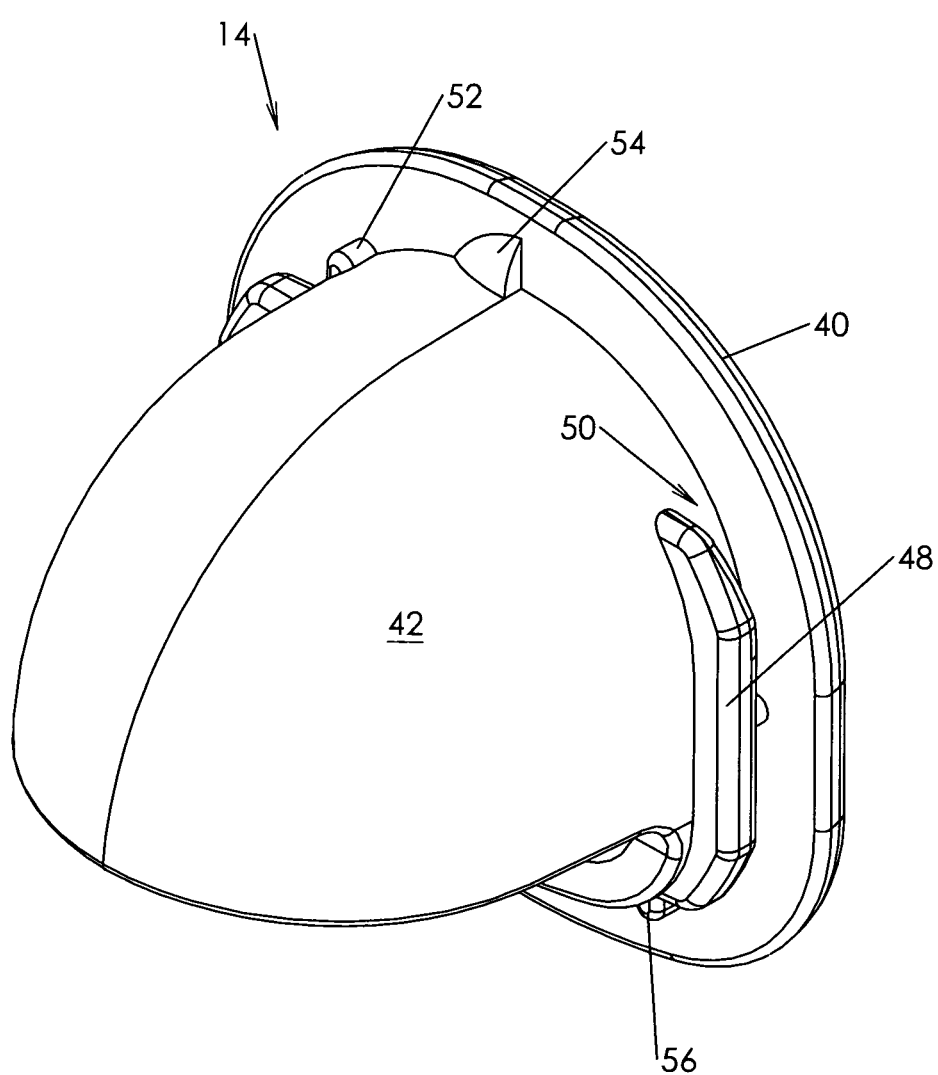
FIG. 2 is a perspective view of the seed port.
Figure 3:
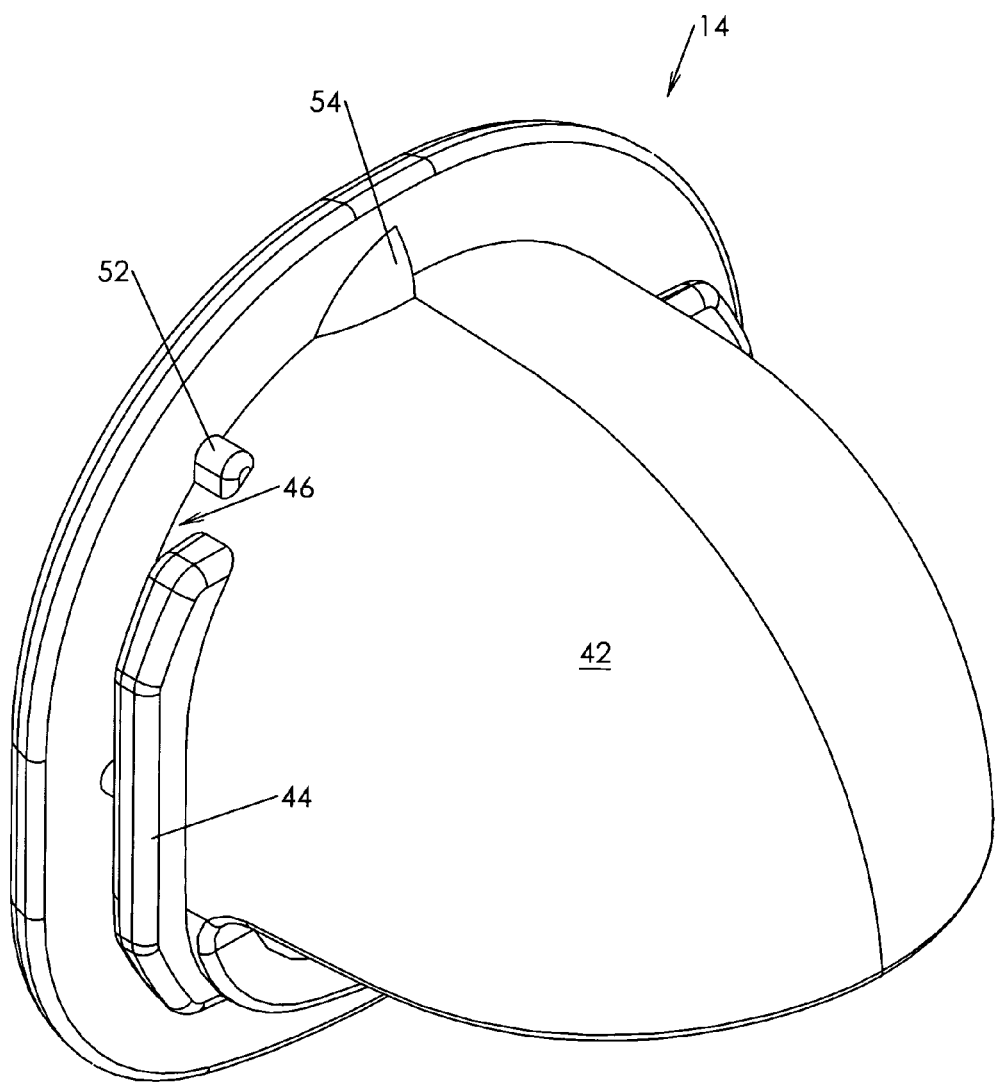
FIG. 3 is a further perspective view of the seed port.
Figure 4:
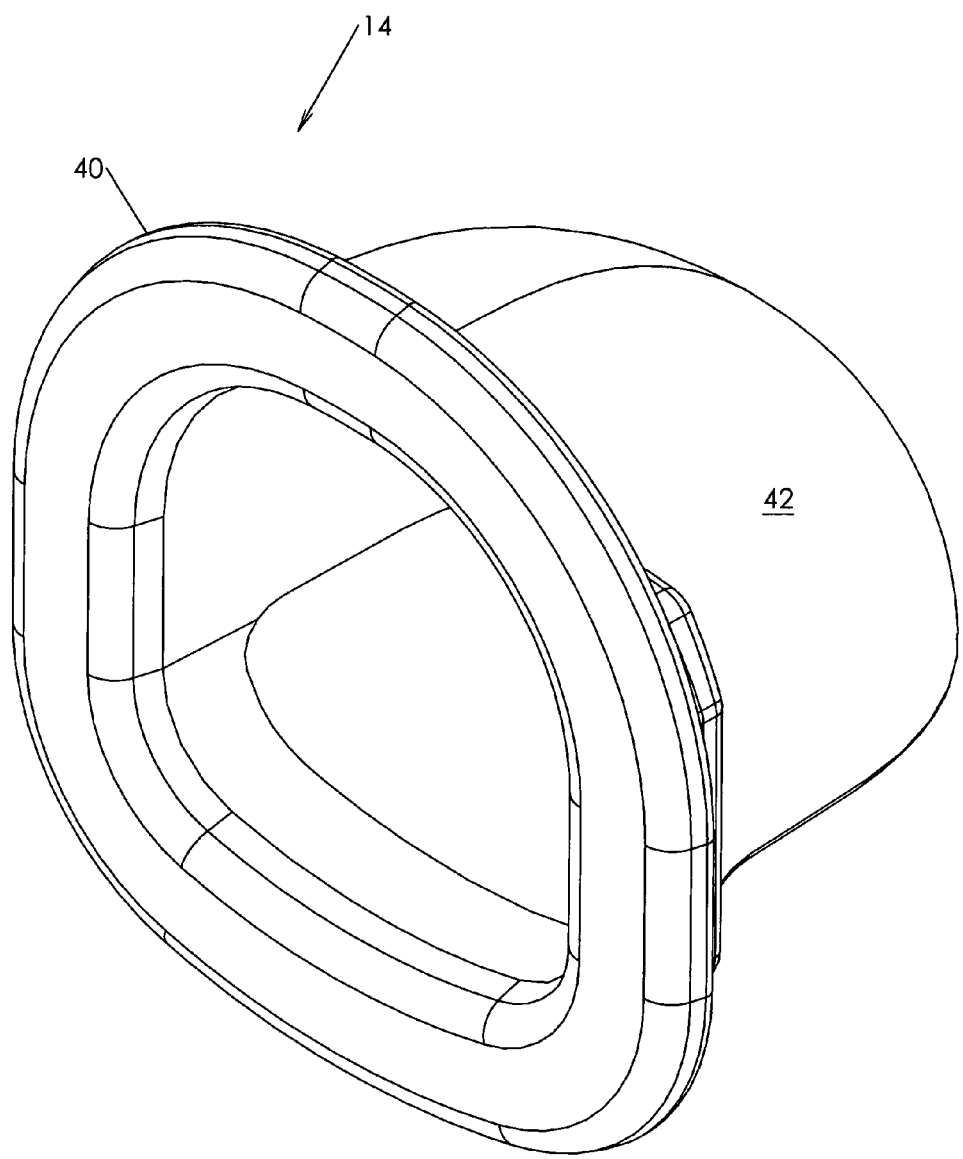
FIG. 4 is a still further perspective view of the seed port.

Referring to the drawings in greater detail and by reference characters thereto, there is illustrated in FIG. 1 a wall section 10 having a seed port aperture generally designated by reference numeral 12 therein and a seed port generally designated by reference numeral 14.

The seed port aperture 12 is defined by an aperture wall generally designated by reference numeral 16. Aperture wall 16 includes a first circular wall segment 18 and a second circular segment 20. Situated intermediate first circular wall segment 18 and second circular wall segment 20 is a first recess generally designated by reference numeral 22. First recess 22 in turn is defined by a first arcuate wall segment 24 and a second arcuate wall segment 26. Formed intermediate first arcuate wall segment 24 and second arcuate wall segment 26 is a notch 27. A stop 28 is formed by the wall joining second arcuate wall segment 26 and first circular segment 18.

A second recess is generally designated by reference numeral 30 and is generally diametrically opposite first recess 22. Second recess 30 is defined by an arcuate wall segment 32 followed by first straight wall segment 34 and second straight wall segment 36. At the point of joinder of second straight wall segment 36 and second arcuate wall segment 26, there is formed a stop 38.

Seed port 14 includes a front wall 40 and a baffle 42. Located on baffle 42 is a first rib 44 which, with front wall 40, defines a first channel 46. On the other side of baffle 42, there is a second rib 48 which, with front wall 40, defines a second channel generally designated by reference numeral 50.

At the point of joinder of baffle 42 and front wall 40, there is provided a second protrusion 52 for reasons which will become apparent hereinbelow. A larger first protrusion 54 is again formed at the point of joinder of front wall 40 and baffle 42. A third protrusion 56 is also provided for reasons which will be discussed hereinbelow.

Figure 5:
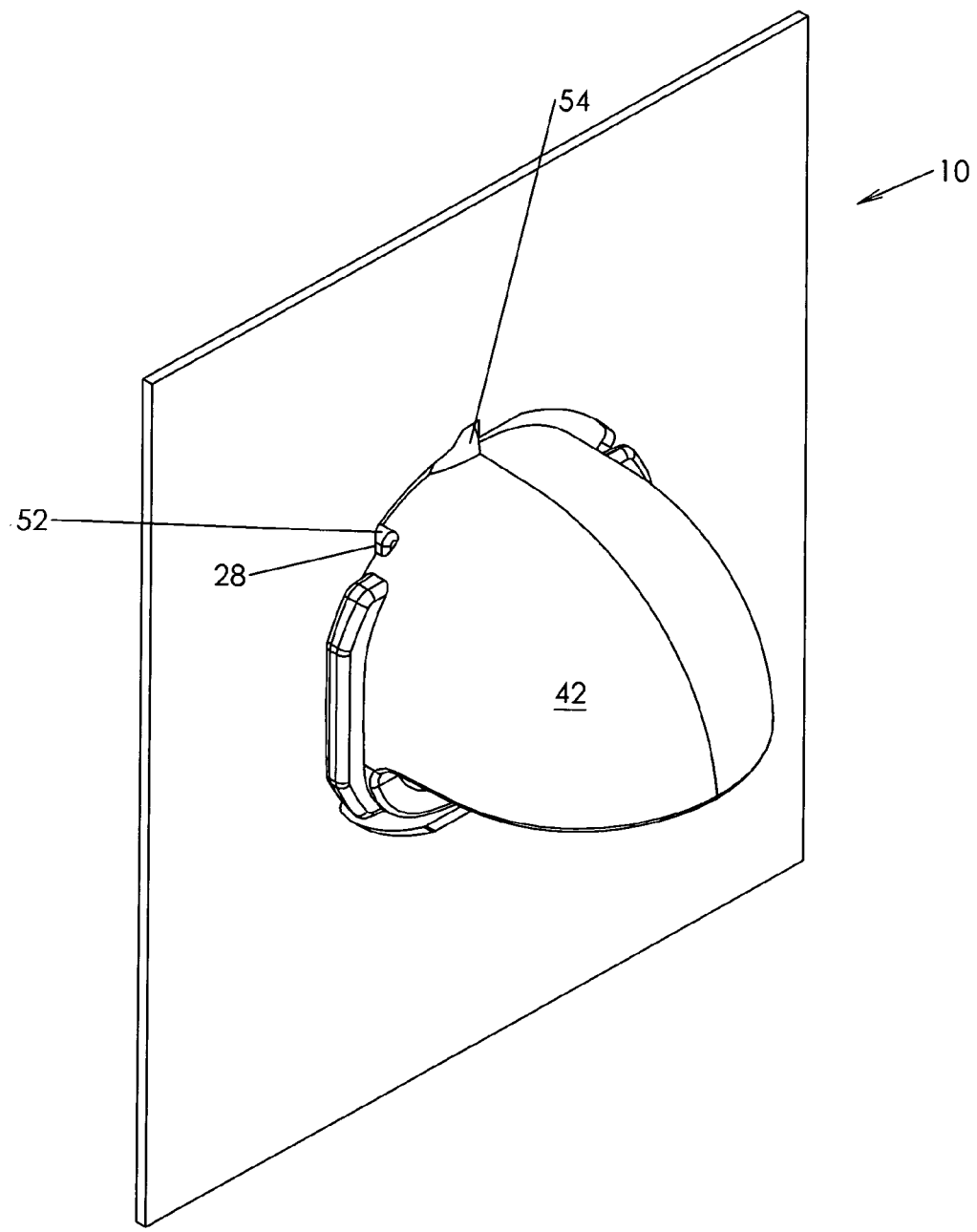
FIG. 5 is a perspective view from the interior of the seed port inserted in the wall of the seed tube.
Figure 6:
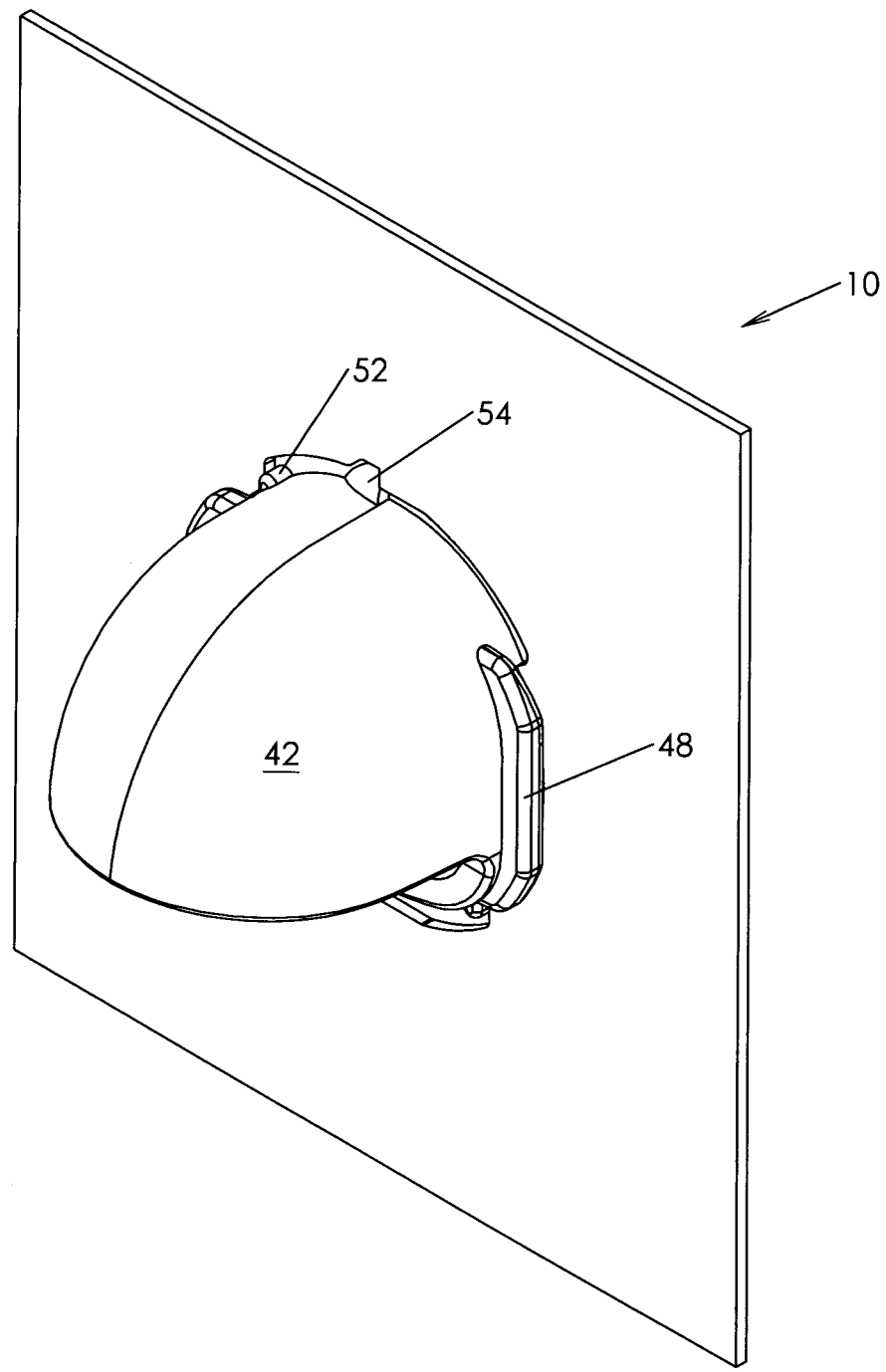
FIG. 6 is a perspective view of the seed port inserted in the container wall.
Figure 7:
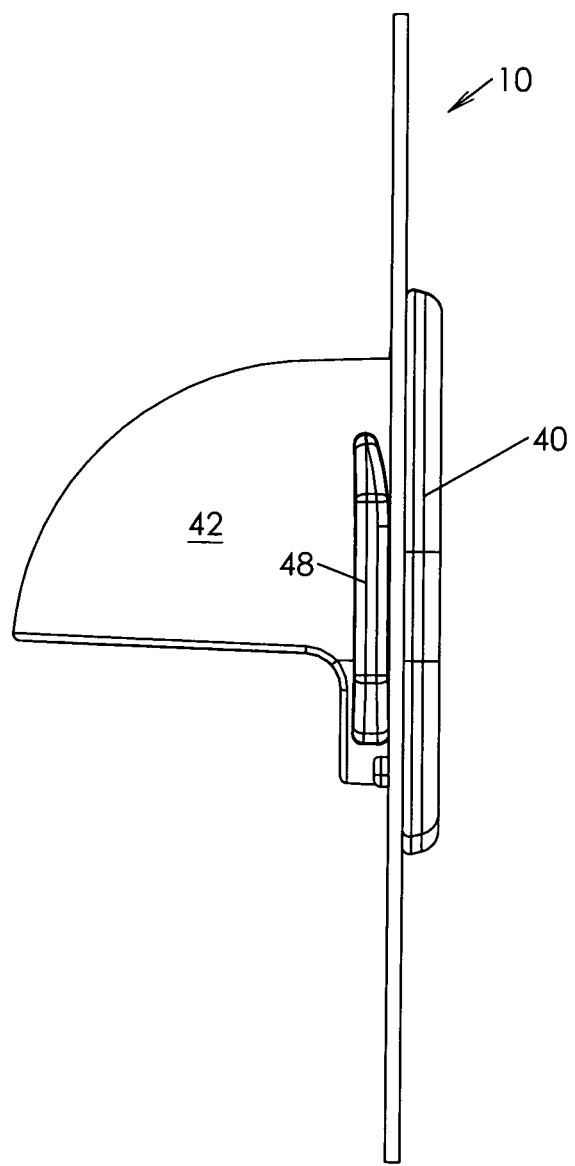
FIG. 7 is a side elevational view of the seed port when inserted in the wall.

In assembling the seed port 14 with wall section 10, the seed port 14 is placed in a position as shown in FIG. 1. In this orientation, the seed port 14 easily fits through seed port aperture 12. Seed port 14 is then rotated to the position shown in FIGS. 5 to 7. As may be seen in the drawings, second protrusion 54 locks within notch 27 such that the seed port may not be turned back to loosen the same. First protrusion 52 comes against stop 28 to ensure that the seed port cannot continue to be rotated. Third protrusion 56 performs a similar function against stop 38.

The arrangement provides a seed port which is securely locked in position. The arrangement is such that the seed port cannot be removed since either further rotation or counter rotation would be required. Both of these are prevented from occurring.

It will be understood that the above described embodiment is for purposes of illustration only and that changes and modifications may be made thereto without departing from the spirit and scope of the invention.

I claim:

1. A bird feeder comprising:
   a seed container having a side wall;
   said side wall having an aperture formed therein, said aperture being defined by an aperture wall having a plurality of wall segments;
   first and second areas of said wall segments being diametrically opposed to each other;
   a first recess in said aperture wall intermediate said first and second wall segments, said first recess extending outwardly from said first and second wall segments and being defined by third and fourth arcuate wall segments, a notch being located between said third and fourth arcuate wall segments;
   a seed port inserted into said aperture, said seed port having a front wall and a baffle, first and second ribs extending outwardly from said baffle to define first and second channels respectively, between said ribs and a rear face of said front wall, said first and second channels respectively retaining said first and second wall segments therein; and
   a first protrusion formed on said rear face of said front wall, said first protrusion extending into said notch.

2. The bird feeder of claim 1 wherein each of said first and second wall segments has a generally semi-circular configuration.

3. The bird feeder of claim 1 wherein a point of joinder between said third wall segment and said second wall segment has a wall, said wall forming a stop; and a second protrusion formed on said rear face of said front wall, said second protrusion formed on said rear face of said front wall, said second protrusion engaging said stop.

4. The bird feeder of claim 3 further including a second recess formed between said first and second wall segments, said second recess being generally diametrically opposed to said first recess.

5. The bird feeder of claim 4 further including a third protrusion formed on said rear face of said front wall, said second recess having a first arcuate segment and first and second straight line segments, a point of joinder between said second straight line segment and said second generally circular wall segment having a wall forming a stop for said third protrusion.

* * * * *